United States Patent
Pagano et al.

(10) Patent No.: US 9,935,470 B2
(45) Date of Patent: Apr. 3, 2018

(54) SYSTEM AND METHOD FOR WIRELESS POWER TRANSFER USING A POWER CONVERTER WITH A BYPASS MODE

(71) Applicant: INTEGRATED DEVICE TECHNOLOGY, INC., San Jose, CA (US)

(72) Inventors: Rosario Pagano, Chandler, AZ (US); Christopher Joseph Daffron, Phoenix, AZ (US); Angel Maria Gomez Arguello, Phoenix, AZ (US); Siamak Abedinpour, Scottsdale, AZ (US)

(73) Assignee: Integrated Device Technology, Inc., San Jose, CA (US)

( * ) Notice: Subject to any disclaimer, the term of this patent is extended or adjusted under 35 U.S.C. 154(b) by 115 days.

(21) Appl. No.: 14/923,736

(22) Filed: Oct. 27, 2015

(65) Prior Publication Data

US 2017/0117717 A1    Apr. 27, 2017

(51) Int. Cl.
*H02J 5/00* (2016.01)
*H02J 50/80* (2016.01)
*H02J 50/10* (2016.01)
*H02M 3/158* (2006.01)
*H02M 1/00* (2006.01)

(52) U.S. Cl.
CPC .............. *H02J 5/005* (2013.01); *H02J 50/10* (2016.02); *H02J 50/80* (2016.02); *H02M 3/158* (2013.01); *H02M 2001/0045* (2013.01)

(58) Field of Classification Search
CPC ............ H02J 5/005; H02J 50/80; H02J 50/10; H02M 3/158
See application file for complete search history.

(56) References Cited

U.S. PATENT DOCUMENTS

| 2007/0182397 | A1* | 8/2007 | Deguchi | H02J 7/0065 323/284 |
| 2009/0243397 | A1* | 10/2009 | Cook | H02J 5/005 307/104 |
| 2010/0134078 | A1* | 6/2010 | Murakami | H02J 7/0065 323/271 |
| 2014/0062440 | A1* | 3/2014 | Garrett | H02M 3/156 323/282 |
| 2015/0076906 | A1 | 3/2015 | Tamegai et al. | |

FOREIGN PATENT DOCUMENTS

WO    2005013455 A1    2/2005

OTHER PUBLICATIONS

International Search Report for PCT Application No. PCT/US2016/059177 issued by the European Patent Office dated Jan. 26, 2017; pp. 1-4.
Written Opinion of the ISA for PCT Application No. PCT/US2016/059177 issued by the European Patent Office dated Jan. 26, 2017; pp. 1-6.

* cited by examiner

*Primary Examiner* — Rexford Barnie
*Assistant Examiner* — Elim Ortiz
(74) *Attorney, Agent, or Firm* — Haynes and Boone, LLP (57) ABSTRACT

A system and method of wireless power transfer using a power converter with a bypass mode includes a power converter. The power converter includes a pulsed switch, a capacitor configured to supply a drive voltage to the pulsed switch, a first circuit configured to charge the capacitor when the power converter operates in a switched mode of operation, and, a second circuit configured to charge the capacitor when the power converter operates in a bypass mode of operation.

12 Claims, 11 Drawing Sheets

SYSTEM AND METHOD FOR WIRELESS POWER TRANSFER USING A POWER CONVERTER WITH A BYPASS MODE

TECHNICAL FIELD

The present disclosure relates generally to wireless power transfer and more particularly to wireless power transfer using a power converter with a bypass mode.

BACKGROUND

Wireless power transfer offers a convenient technique for conveying electrical power without the use of traditional electrical cords. Among other advantages, wireless power transfer reduces safety hazards associated with cords, such as tripping and fire hazards, and improves aesthetics by reducing cord clutter. Still further, wireless power transfer is a low-hassle and cost-effective alternative to wired charging for portable electronics. For example, for portable electronics that are charged daily, wireless power transfer reduces the likelihood of misplacing wired chargers and prevents wear-and-tear associated with repeatedly plugging and unplugging the devices.

Accordingly, it would be desirable to provide improved wireless power transfer systems.

SUMMARY

Consistent with some embodiments, a power converter includes a pulsed switch, a capacitor configured to supply a drive voltage to the pulsed switch, a first circuit configured to charge the capacitor when the power converter operates in a switched mode of operation, and a second circuit configured to charge the capacitor when the power converter operates in a bypass mode of operation.

Consistent with some embodiments, a system includes a feedback circuit that generates a pulse width modulation signal based on an output voltage of a power converter and a reference voltage and a threshold voltage detection circuit. The threshold voltage detection circuit is configured to determine whether a duty cycle of the pulse width modulation signal exceeds a predetermined threshold. When the duty cycle exceeds the predetermined threshold, the threshold voltage detection circuit is further configured to send a first signal to close a bypass switch associated with the power converter and send a second signal to enable a charge pump associated with a pulsed switch associated with the power converter.

Consistent with some embodiments, a method includes reducing a voltage differential between an input terminal and an output terminal of a power converter. When the voltage differential drops below a first threshold voltage, the method further includes enabling a charge pump associated with a high-side n-type transistor of the power converter and closing a bypass switch associated with the power converter.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The benefits of wireless power transfer, discussed previously, may be enhanced when a wireless power receiver is designed using small, lightweight, and/or cost-effective components. Furthermore, it is desirable for the wireless power receiver to include features that improve the energy efficiency and reliability of various sub-modules. For instance, many wireless power receivers include a DC-DC power converter, such as a buck converter. Although a DC-DC power converter is often useful in a wireless power receiver, there are occasions when it would be more energy efficient to bypass the DC-DC converter stage. However, implementing a circuit for bypassing a DC-DC converter presents a number of challenges, such as preventing overcurrents through the bypass circuit. Moreover, the smallest available switching components for DC-DC power converters are, in many cases, n-type transistors, which may be up to two to three times smaller than their p-type counterparts. However, constructing a DC-DC power converter using n-type transistors presents unique challenges, particularly for n-type high-side transistors. Accordingly, it would be desirable to provide a reliable, efficient bypass mechanism for a power converter that uses n-type high-side transistors.

Figure 1:
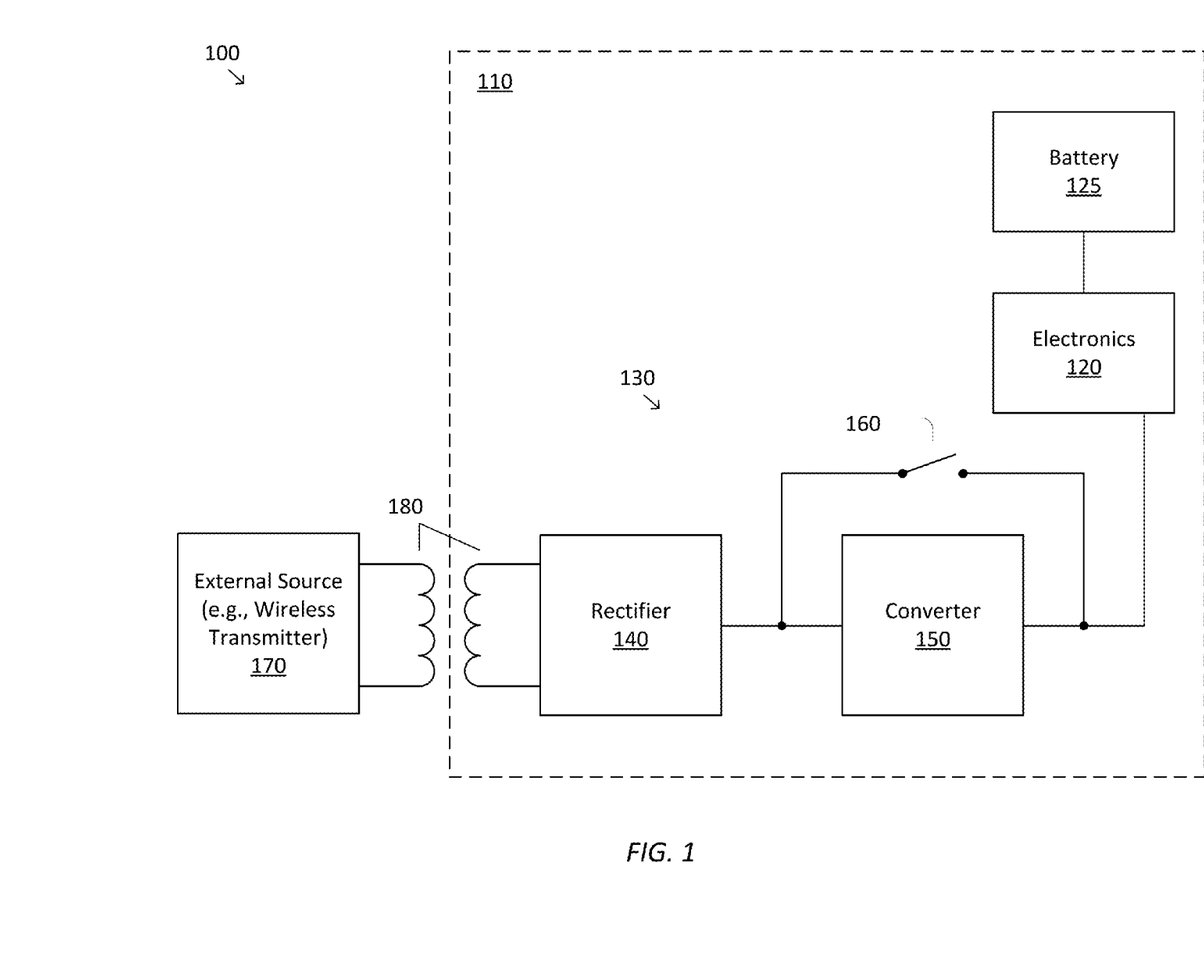
FIG. 1 is a simplified diagram of an electronic system with a converter bypass mode according to some embodiments.

FIG. 1 is a simplified diagram of an electronic system 100 with a converter bypass mode according to some embodiments. Electronic system 100 includes an electronic device 110. Electronic device 110 may be virtually any electronic device, such as a desktop or portable computer, a mobile computing device such as a smart phone or watch, a remote control, an electric and/or hybrid electric vehicle, and/or the like. Electronic device 110 may include one or more electronics modules 120 that serve as a load of the electronic system 100. Electronics module 120 may include any electronic component of the above mentioned electronic devices such as an integrated circuit, a display, an actuator, a sensor, a signal processor circuit, and/or the like and/or a combination thereof. In some examples, electronics module 120 may be coupled to a battery 125. Battery 125 serves as a load of electronic system 100 when charging and as a source of power when discharging. According to some examples, battery 125 may be charged when electronics module 120 is receiving power from an external power source and may be discharged when no external power source is available. Battery 125 may include any suitable energy storage device such as, without limitation, a lithium ion battery, a capacitor, a supercapacitor and/or the like.

Electronic device 110 receives power using a power supply 130. According to some embodiments, power supply 130 may include a rectifier 140 and a converter 150. Rectifier 140 performs alternating current (AC) to direct current (DC) conversion to convert received AC power into DC power. Rectifier 140 may use any suitable topology, or combination of topologies, such as full-bridge and/or half-bridge, and may be synchronous or asynchronous. Converter 150 performs DC-DC conversion to shift the voltage of the DC power for delivery to electronic module 120 and/or battery 125. Like rectifier 140, converter 150 may use any suitable topology, including synchronous or asynchronous topologies. For example, when converter 150 is a DC-DC switched mode converter, the topology of converter 150 may include buck, boost, buck-boost, flyback, forward, or any other suitable DC-DC switched mode topology.

According to some embodiments, converter 150 may have a bypass mode that allows the power conversion step to be bypassed. Consistent with such embodiments, converter 150 may be associated with a bypass switch 160. When bypass switch 160 is open, power from rectifier 140 is conditioned by converter 150 before being delivered to electronic module 120. When bypass switch 160 is closed, power from rectifier 140 is delivered directly to electronic module 120 without further conditioning by converter 150. The bypass mode of converter 150 reduces energy losses associated with converter 150 in situations where the power conversion step can be skipped, such as when the power from rectifier 140 is suitable for delivery to electronic module 120 without further conditioning by converter 150.

Power supply 130 receives power from an external power source 170. As depicted in FIG. 1, power supply 130 may be configured as a wireless power receiver. In accordance with such embodiments, external power source 170 is configured as a wireless power transmitter. According to some examples, electromagnetic fields may be used to transmit power from external power source 170 to power supply 130. In some embodiments, when the electromagnetic fields include time-varying magnetic fields, external power source 160 may be coupled to power supply 130 using inductive, near-field, and/or resonant power transfer coupling mechanisms and/or the like. In furtherance of such embodiments, external power source 170 and power supply 130 may include inductive coils 180 for wireless power transfer. In addition to transporting electrical power, the electromagnetic fields may also be used to communicate data between electronic device 110 and external power source 170. Although FIG. 1 depicts wireless power transfer from external power source 170 to power supply 130, it is to be understood that power supply 130 may alternately, or additionally, be configured as a wired power supply. In furtherance of such embodiments, external power source 170 is configured to provide power over a wire. The wire may include any suitable conductor, such as a USB cable, an Ethernet cable, a dock connector, an AC power cord, a laptop charging cable, and/or the like. In addition to transporting electrical power, the cable may also be used to communicate data between electronic device 110 and external power source 170.

Figure 2:
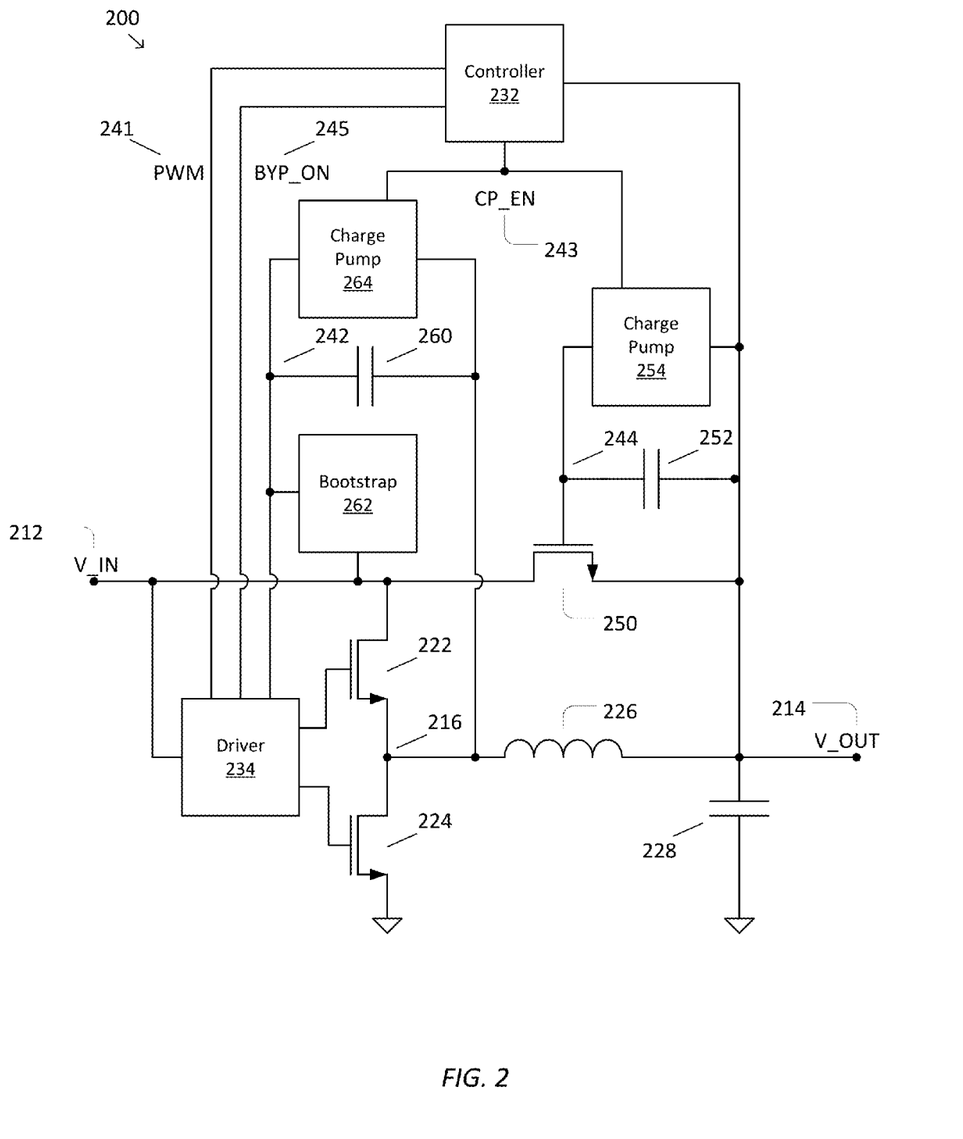
FIG. 2 is a simplified diagram of a buck converter with a bypass mode according to some embodiments.

FIG. 2 is a simplified diagram of a buck converter 200 with a bypass mode according to some embodiments. In some embodiments consistent with FIG. 1, buck converter 200 may be used to implement at least some portions of power supply 130, including converter 150 and/or bypass switch 160.

Buck converter 200 performs DC-DC conversion between input node 212 (V_IN) and output node 214 (V_OUT). The DC voltage of output node 214 is configurable within a range from zero volts to the DC voltage of input node 212. Compared to other circuits that may be used to perform DC-DC conversion, the buck topology, as employed by buck converter 200, is efficient in terms of energy dissipation and size. As depicted in FIG. 2, buck converter 200 has a synchronous buck topology, which includes a high-side pulsed switch 222 coupled between input node 212 and switching node 216, a low-side pulsed switch 224 coupled between switch node 216 and ground, an inductor 226 coupled between switching node 216 and output node 214, and a capacitor 228 coupled between output node 214 and ground. In the synchronous buck topology depicted in FIG. 2, pulsed switches 222 and 224 are synchronously switched—that is, when one switch is closed the other is open and vice versa. The switching occurs at high frequencies (e.g., 10 kHz and higher).

In some examples, inductor 226 may include an air core inductor, ferrite core inductor, integrated circuit (IC) inductor, and/or the like. The inductance of inductor 224 is generally selected based on the switching frequency and the allowable ripple current of buck converter 200 and may therefore vary over a wide range based on the intended application. For example, the inductance of inductor 232 may be in the range from 1 µH to 100 mH. Similarly, capacitor 228 may include any suitable type of capacitor, such as an electrolytic capacitor, ceramic capacitor, polymer capacitor, and/or the like. In some embodiments, capacitor 228 may be omitted. For example, the capacitance of capacitor 228 may be in the range from 0 F to 1 mF.

Pulsed switches 222 and 224 are opened and closed (i.e., turned off and on) using a controller 232 and a driver 234. Controller 232 monitors the DC voltage of output node 214 and generates a pulsed width modulation (PWM) control signal to maintain the DC voltage of output node 214 at a desired level. According to some embodiments, the PWM control signal may include a series of voltage pulses transmitted at regular intervals and having a variable duty cycle. The duty cycle is set by controller 232 in order to achieve the target DC voltage of output node 214. The duty cycle can range from 0% (no power flows from input node 212 to output node 214, i.e., zero DC output voltage) to 100% (power continuously flows from input node 212 to output node 214, i.e., input and output DC voltages are the same). At intermediate values (e.g., 50% duty cycle), power is extracted from input node 212 in bursts through high-side pulsed switch 222, filtered by an LC circuit that includes inductor 226 and/or capacitor 228, and delivered as DC power to output node 214.

The PWM control signal is transmitted to driver 234 via PWM control node 241 (PWM). Driver 234 receives the PWM control signal from controller 232 and transmits corresponding gate drive signals to open and close pulsed switches 222 and 224. In general, the voltages of the gate drive signals relative to the PWM control signal depend on the implementation of pulsed switches 222 and 224. Accordingly, driver 234 may include circuits to convert the PWM control signal into suitable gate drive signals, such as logic circuits, level shifters, charge pumps, amplifiers, and/or the like. The gate drive signals are applied to the control terminals of pulsed switches 222 and 224, such as a gate terminal and/or a base terminal.

A bypass switch 250 is coupled between input node 212 and output node 214. When bypass switch 250 is closed, input node 212 and output node 214 are directly electrically coupled, thereby clamping the DC output voltage to the DC input voltage. Using bypass switch 250, buck converter 200 has at least two modes of operation: (1) switching mode, where bypass switch 250 is open and pulsed switches 222 and 224 are operated at less than 100% duty cycle and (2) bypass mode, where bypass switch 250 is closed and pulsed switches 222 and 224 are operated at 100% duty cycle.

According to some embodiments, pulsed switches 222 and 224 and bypass switch 250 may be implemented using transistors, such as metal oxide semiconductor field effect transistors (MOSFETs) and/or insulated gate bipolar transistors (IGBTs). Each transistor has a source, gate, and drain and is turned on and off by applying a gate voltage relative to the source voltage. Transistors may be classified as n-type transistors (e.g., NMOS) and/or p-type transistors (e.g., PMOS). An n-type transistor is turned on when the gate voltage exceeds the source voltage by at least a threshold voltage, and a p-type transistor is turned on when the gate voltage is lower than the source voltage by at least threshold voltage. As depicted in FIG. 2, pulsed switches 222 and 224 and bypass switch 250 are implemented using NMOS transistors.

In many conventional DC-DC converters, high-side switches are implemented using p-type transistors because it is challenging to generate a sufficiently high gate voltage to turn on a high-side n-type transistor. Additional circuitry, such as a bootstrap capacitor and bootstrap circuit, is often used to generate a gate drive signal having a sufficiently high voltage to turn on a high-side n-type transistor. However, this additional circuitry typically limits the functionality of the conventional DC-DC converter. For example, bootstrapping is frequently associated with a maximum duty cycle (that is, bootstrap circuits are ineffective at or near 100% duty cycle). This may preclude the operation of a DC-DC converter with high-side n-type transistors in a bypass mode of operation. However, p-type transistors are generally two to three times larger than their n-type counterparts. Accordingly, it would be desirable to provide an improved power converter that uses high-side n-type transistors and is capable of operation in a bypass mode of operation.

In order to address these challenges, buck converter 200 may include a high-side supply capacitor 260 coupled between high-side supply node 242 and switching node 216. Driver 234 is coupled to high side supply node 242 to draw charge from high-side supply capacitor 260. High-side supply capacitor 260 stores charge at a voltage that exceeds the threshold voltage of high-side pulsed switch 222. Accordingly, driver 234 turns on high-side pulsed switch 222 by applying charge from high-side supply capacitor 260 to the gate of high side pulsed switch 222.

Two subcircuits are used to maintain the voltage of high-side supply capacitor 260. The first is a bootstrap circuit 262, which is coupled between input node 212 and high-side supply node 242. Bootstrap circuit 262 charges high-side supply capacitor 260 when buck converter 200 is operating in the switching mode of operation. The second subcircuit is a charge pump circuit 264, which is coupled between switching node 216 and high-side supply node 242 (i.e., in parallel with high-side supply capacitor 260). Charge pump circuit 264 charges high-side supply capacitor 260 when buck converter 200 is operating in the bypass mode of operation. Charge pump 264 receives a charge pump enable signal 243 (CP_EN) from controller 232 indicating when buck converter 200 is operating in bypass mode.

A bypass supply capacitor 252 and a charge pump 254 are coupled between bypass supply node 244 and output node 214. Like charge pump 264, charge pump 254 receives charge pump enable signal 243 from controller 232 indicating when buck converter 200 is operating in bypass mode. When enabled, charge pump 254 charges bypass supply capacitor 252 to a voltage sufficient to turn on bypass switch 250.

According to some embodiments, when transitioning from switched mode to bypass mode, controller 232 may increase the duty cycle of buck converter 200 from its initial value towards 100%. Controller 232 may additionally and/or alternately reduce the DC input voltage of input node 212. For example, in some embodiments consistent with FIG. 1, controller 232 may communicate with an external power source, such as external power source 170, and/or an input stage, such as rectifier 140, to reduce the DC input voltage of input node 212. In some examples, controller 232 may monitor a voltage differential between input node 212 and output node 214 as the output voltage increases and/or the input voltage decreases. When the voltage differential reaches a threshold voltage, controller 232 may enable charge pumps 254 and 264 via charge pump enable signal 243. In some examples, controller 232 may concurrently set the duty cycle of buck converter 200 to 100% by transmitting a bypass mode signal 245 (BYP_ON) to driver 234.

According to some embodiments, when transitioning from bypass mode to switched mode, controller 232 may disable charge pumps 254 and 264 via charge pump enable signal 243. Controller 232 may further communicate the transition from bypass mode to switched mode to driver 234 via bypass mode signal 245. As a result, input node 212 and output node 214 are no longer clamped and bootstrap circuit 262 resumes the role of charging high-side supply capacitor 260. For example, controller 232 may decrease the duty cycle of buck converter 200 back to its initial value prior to entering bypass mode. Controller 232 may additionally and/or alternately increase the DC input voltage of input node 212. For example, in some embodiments consistent with FIG. 1, controller 232 may communicate with an external power source, such as external power source 170, and/or an input stage, such as rectifier 140, to increase the DC input voltage of input node 212.

Figure 3:
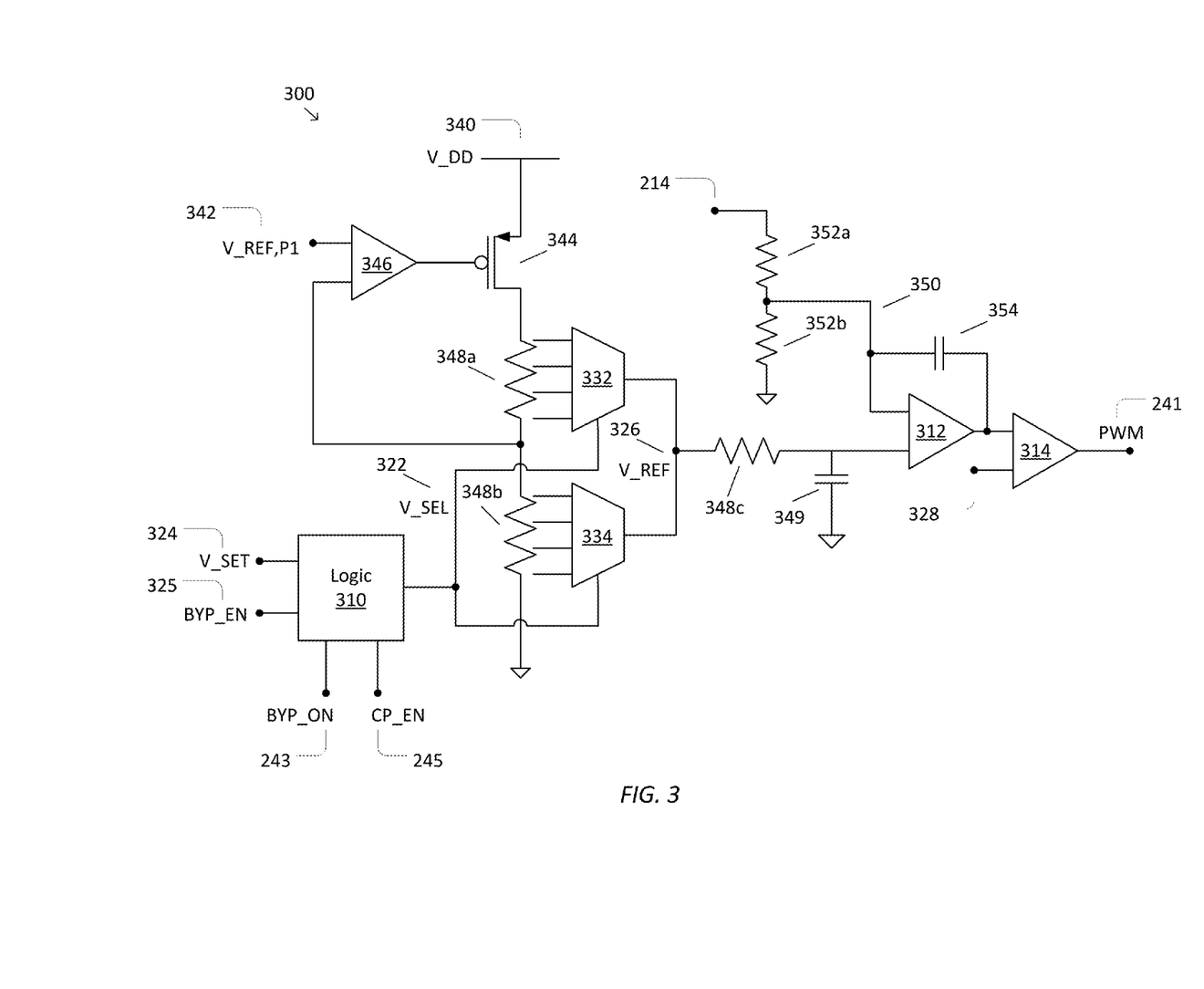
FIG. 3 is a simplified diagram of a controller subcircuit according to some embodiments.

FIG. 3 is a simplified diagram of a controller subcircuit 300 according to some embodiments. According to some embodiments consistent with FIG. 2, controller subcircuit 300 may be used to implement at least a portion of controller 232 in order to generate and transmit a PWM control signal and/or other control signals of buck converter 200. In furtherance of such embodiments, PWM signal generator circuit 300 may be coupled to output node 214, PWM control node 241, charge pump enable signal 243, and/or bypass mode signal 245 of buck converter 200.

Logic module 310 generates a voltage selection signal 322 (V_SEL) based on an input voltage setting signal 324 (V_SET). According to some embodiments, logic module 310 may further generate charge pump enable signal 243 (CP_EN) and/or bypass mode signal 245 (BYP_ON) based on a bypass enable signal 325 (BYP_EN). According to some embodiments, voltage selection signal 322 and voltage setting signal 324 may be digital values of, e.g., between six and eight bits. Voltage selection signal 322 is sent to multiplexers 332 and 334 in order to generate a reference voltage 326 (V_REF). According to some embodiments, reference voltage 326 may be generated using a subcircuit that includes a supply voltage node 340 (V_DD), a fixed voltage node 342 (V_REF,P1), a p-type transistor 344, a comparator 346, resistors 348a-c, and a capacitor 349 arranged in relation to multiplexers 332 and 334 as depicted in FIG. 3.

A voltage differential between reference voltage 326 and a feedback voltage 350 is amplified using an operational amplifier 312. According to some embodiments, feedback voltage 350 may be determined based on the voltage of output node 214, using a voltage divider that includes resistors 352a-b. In some examples, operational amplifier 312 may be associated with a feedback capacitor 354. The output of operational amplifier 312 is compared to a sawtooth waveform 328 using a comparator 314. The output of comparator 314 is the PWM control signal (V_PWM) that is sent to a driver circuit, such as driver 234, via PWM control node 241.

Figure 4:
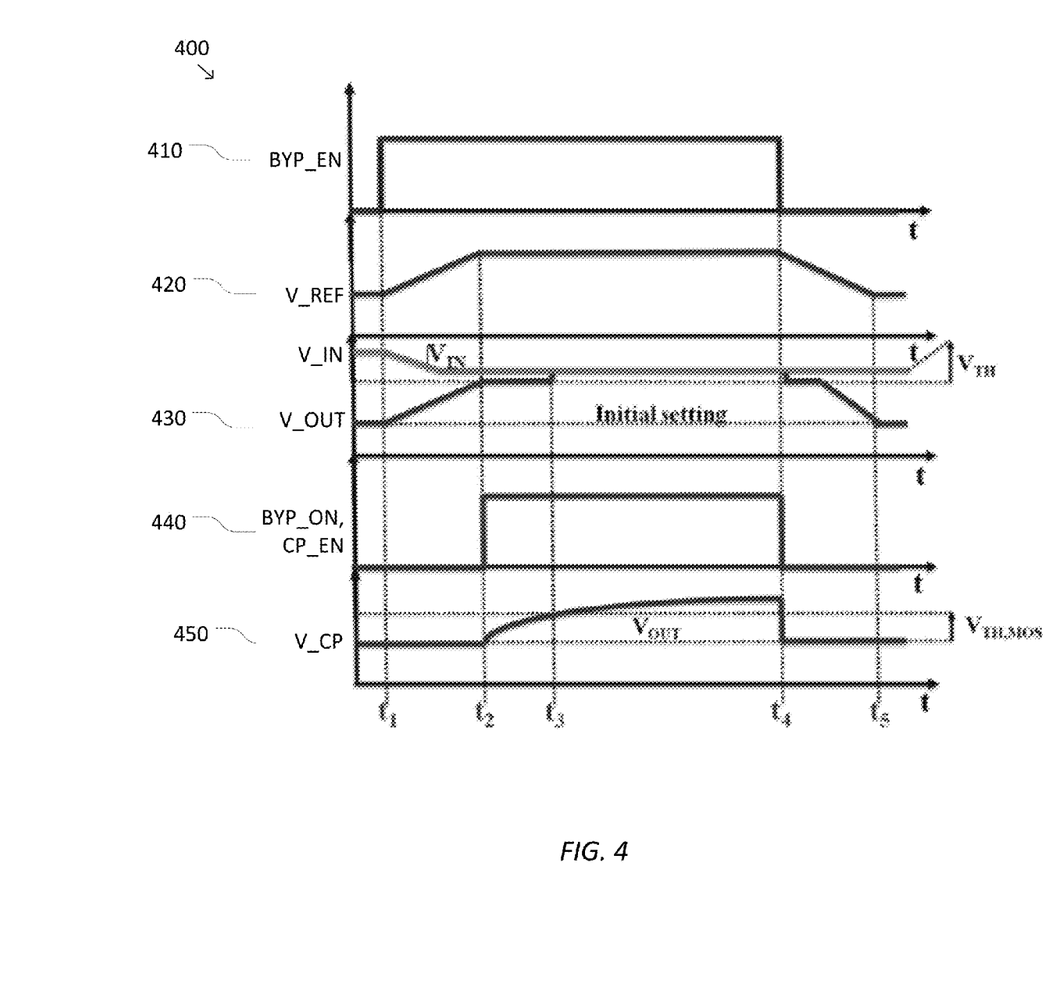
FIG. 4 is a simplified diagram showing timing diagrams corresponding to various nodes of a buck converter and a controller subcircuit when transitioning between the switched mode and bypass mode of operation.

FIG. 4 is a simplified diagram showing timing diagrams 410-450 corresponding to various nodes of buck converter 200 and/or controller subcircuit 300 when transitioning between the switched mode and bypass mode of operation. In some embodiments consistent with FIGS. 2 and 3, the voltage trace depicted in timing diagram 410 may depict bypass enable signal 325, the voltage trace depicted in timing diagram 420 may depict reference voltage 326, the voltage traces depicted in timing diagram 430 may depict the voltages of input node 212 and output node 214, the voltage trace depicted in timing diagram 440 may depict bypass mode signal 245, and the voltage trace depicted in timing diagram 450 may depict the voltages across high-side supply capacitor 260 and bypass supply capacitor 252.

At a time t1, bypass enable signal 325 transitions from low to high, as depicted in timing diagram 410. This marks the onset of the transition from switched mode to bypass mode of operation. As discussed previously with respect to FIG. 2, when entering bypass mode, the voltage of output node 214 increases and the voltage of input node 212 decreases to decrease the voltage differential between the two nodes, as depicted in timing diagram 430 between t1 and t2. In order to increase the voltage of output node 214, reference voltage 326 of controller subcircuit 300 increases, as depicted in timing diagram 420. Although the voltage changes that occur between t1 and t2 are depicted as being linear and gradual in time, it is to be understood that a variety of functions may be used, including but not limited to step functions, nonlinear functions, and/or the like. Furthermore, although both the input and output voltages are depicted as changing between t1 and t2, it is to be understood that zero, one, or both of the input and output voltages may remain constant between t1 and t2.

At a time t2, the voltage differential between input node 212 and output node 214 drops below a threshold voltage, causing bypass mode signal 245 to transition from low to high and charge pumps 254 and 264 to be enabled. Between t2 and t3, charge pumps 254 and 264 begin to charge bypass supply capacitor 252 and high-side supply capacitor 260, respectively.

At a time t3, the voltage across bypass supply capacitor 252 increases above the turn-on threshold voltage of bypass switch 250, causing bypass switch 250 to close. As a result, the voltage of output node 214 is clamped to the voltage of input node 212, as depicted in timing diagram 430. Between t3 and t4, buck converter 200 remains in bypass mode.

At a time t4, bypass enable signal 325 transitions from high to low, as depicted in timing diagram 410. This marks the onset of the transition from bypass mode back to switched mode of operation. Also at time t4, bypass mode signal 245 transitions from high to low and charge pumps 254 and 264 are disabled. Disabling charge pump 254 causes bypass switch 250 to reopen, such that input node 212 and output node 214 are no longer clamped. Between t4 and t5, the input and output voltages are restored to their desired settings, which may or may not be the same as the initial settings before t1. In particular, the voltage of output node 214 is controlled using reference voltage 326, as depicted in timing diagram 420. Reference voltage 326 is effective in controlling the voltage of output node 214 when the target output voltage is smaller than the input voltage, so there may be a delay between the transition back to switched mode of operation and the restoration of control of the voltage of output node 214 using reference voltage 326.

Figure 5:
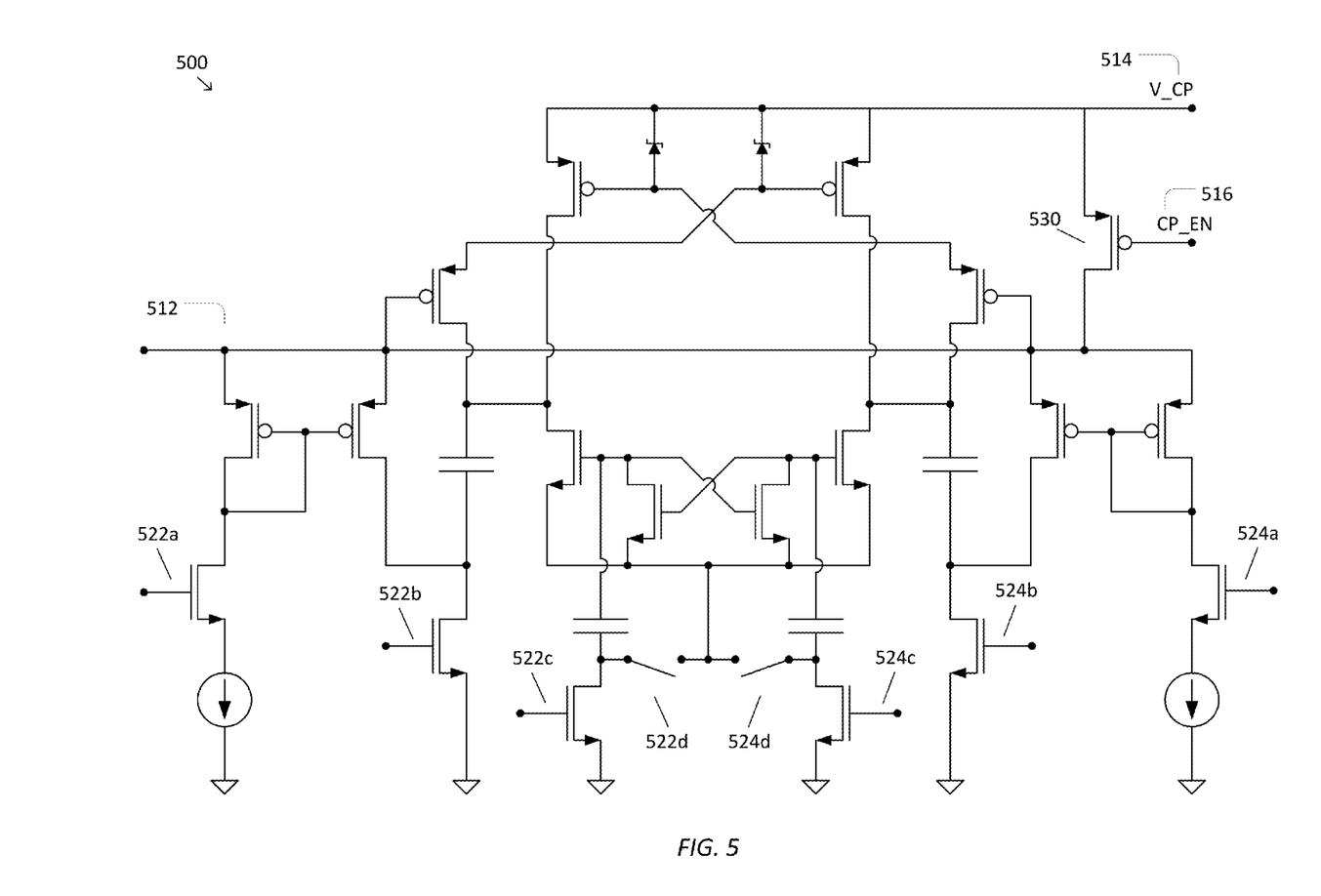
FIG. 5 is a simplified diagram of a charge pump circuit with an enable/disable function according to some embodiments.

FIG. 5 is a simplified diagram of a charge pump circuit 500 with an enable/disable function according to some embodiments. According to some embodiments consistent with FIG. 2, charge pump circuit 500 may be used to implement charge pump 254 and/or charge pump 264 of buck converter 200.

Charge pump circuit 500 includes an input node 512, an output node 514 (V_CP), and an enable/disable node 516 (CP_EN). Charge pump circuit 500 further includes control nodes 522a-d and 524a-d. Charge pump circuit 500 further includes various circuit elements, including p-type transistors, n-type transistors, switches, capacitors, current sources, Zener diodes, and/or the like, arranged as depicted in FIG. 5.

Charge pump circuit 500 receives control signals at control nodes 522a-d and 524a-d and an enable/disable signal, such as charge pump enable signal 243, at enable/disable node 516. When the voltage difference between enable/disable signal and output node 514 is within the threshold voltage of a switch 530, switch 530 is turned off and charge pump circuit 500 is enabled. When the voltage difference exceeds the threshold voltage of switch 530, switch 530 is turned on and the voltage of output node 514 is clamped to the voltage of input node 512. Because the output and input voltages are clamped when switch 530 is closed, charge pump circuit 500 is disabled.

Figure 6:
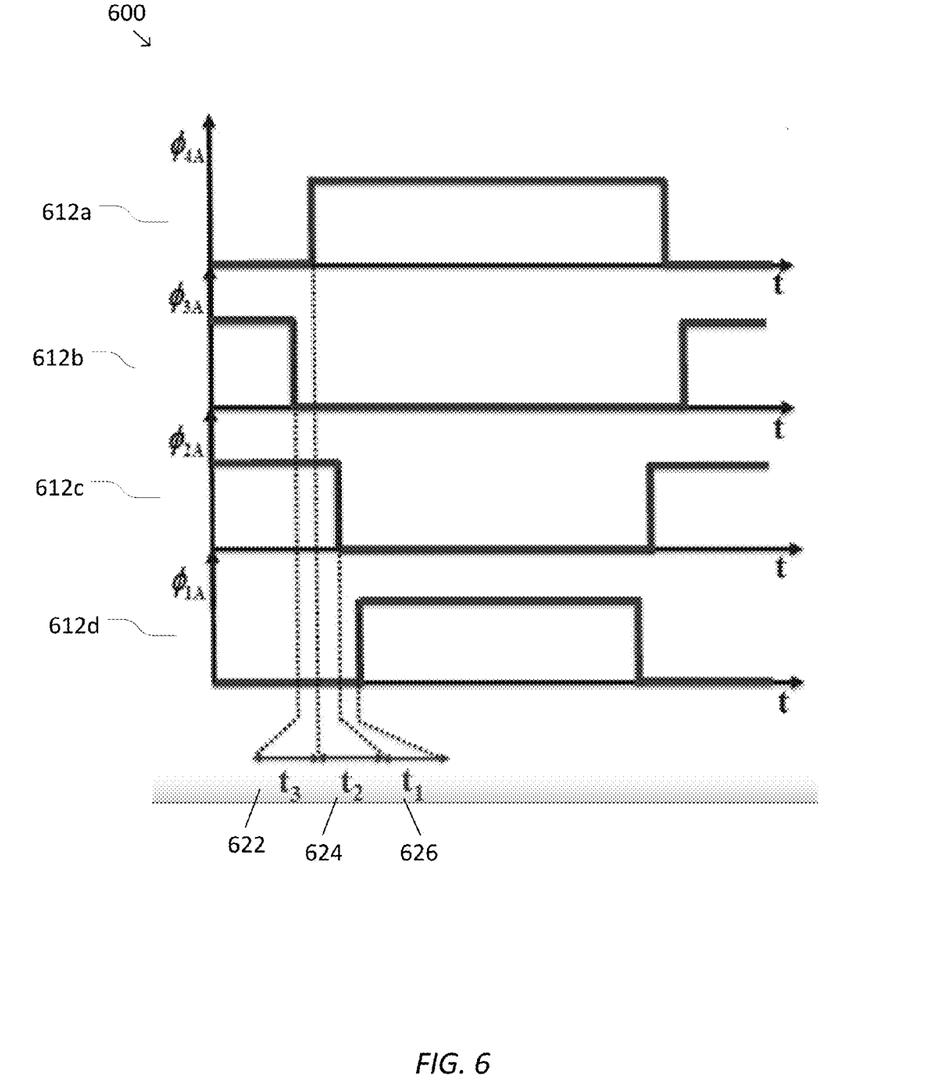
FIG. 6 is a simplified diagram showing timing diagrams of various control signals applied to control nodes of a charge pump circuit during a half switching cycle.

FIG. 6 is a simplified diagram showing timing diagrams of the control signals 612a-d applied to control nodes 522a-d of charge pump circuit 500, respectively, during a half switching cycle. Control signals 612a and 612d are initially low, and control signals 612b and 612c are initially high. At the start of the half switching cycle, control signal 612c transitions from high to low. After a first time delay 622, control signal 612d transitions from low to high. After a second time delay 624, control signal 612b transitions from high to low. After a third time delay 626, control signal 612a transitions from low to high. At the end of the half switching cycle, control signals 612a-d transition back to their initial values in reverse order. Control signals 612a-d are maintained at their initial values for the second half of the switching cycle. During the second half of the switching cycle, control signals similar to control signals 612*a-d* are applied control nodes 524*a-d* of charge pump circuit 500, respectively.

Figure 7:
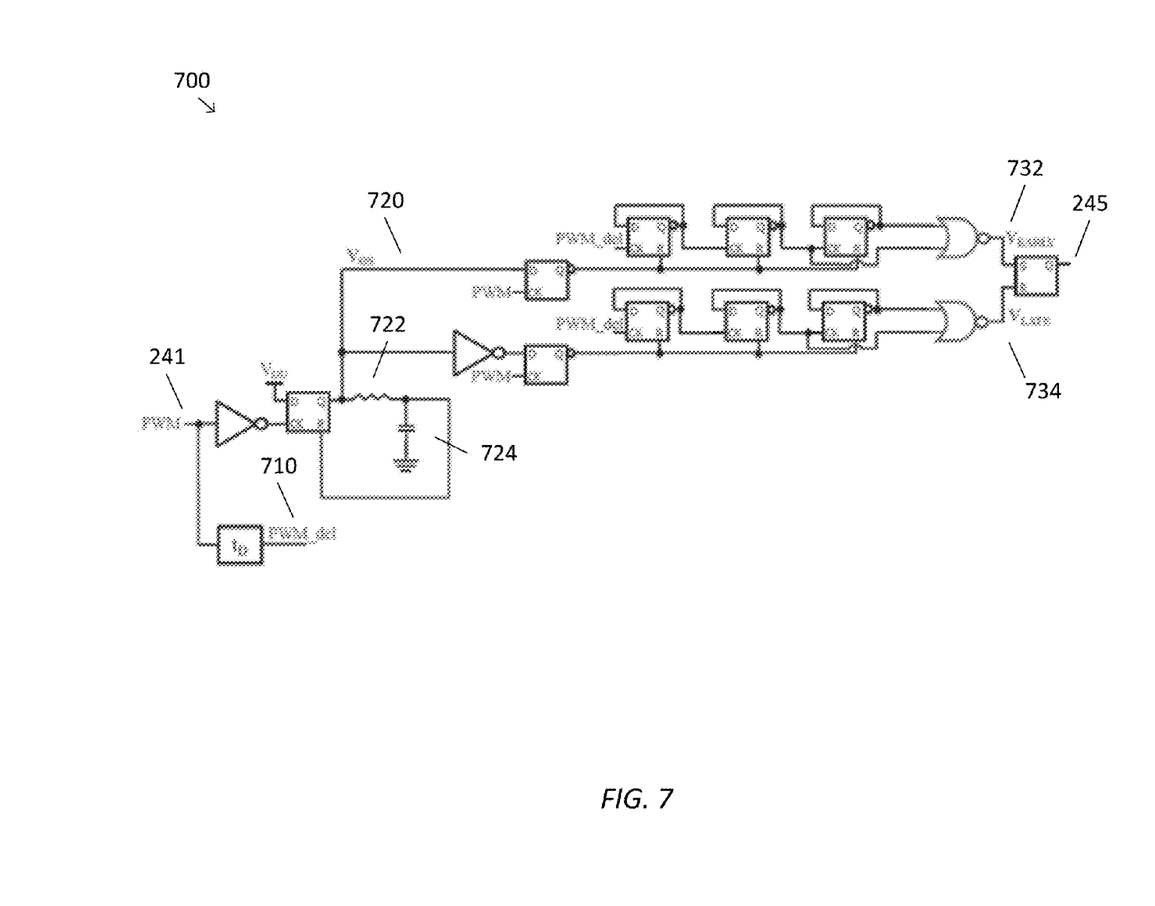
FIG. 7 is a simplified diagram of a threshold voltage detection circuit according to some examples.

FIG. 7 is a simplified diagram of a threshold voltage detection circuit 700 according to some examples. In accordance with some embodiments consistent with FIGS. 2 and 3, threshold voltage detection circuit 700 may be used to implement at least a portion of controller 232 and/or logic module 310.

Threshold voltage detection circuit 700 is coupled to PWM control node 241 to monitor the PWM control signal. The PWM control signal, as well as a delayed version of the PWM signal 710, is routed to various logic blocks of threshold voltage detection circuit 700, as depicted in FIG. 7. The output of the logic operation implemented by threshold voltage detection circuit 700 is bypass mode signal 245. Intermediate signals 732 and 734 are also indicated in FIG. 7.

The logic blocks of threshold voltage detection circuit 700 are arranged such that bypass mode signal 282 transitions from low to high after six consecutive cycles in which the duty cycle of the PWM control signal is considered high. The duty cycle of the PWM control signal is considered high when the duration of the off period of a cycle is less than the duration of a one shot signal 720. The duration of one shot signal 720 is determined based on the RC delay defined by resistor 722 and capacitor 724. Accordingly, a short RC delay results in a low threshold voltage (that is, the bypass mode signal 245 transitions from low to high when the duty cycle of buck converter 200 is very close to 100% and the difference between the input and output voltage is very low) and vice versa.

Figure 8:
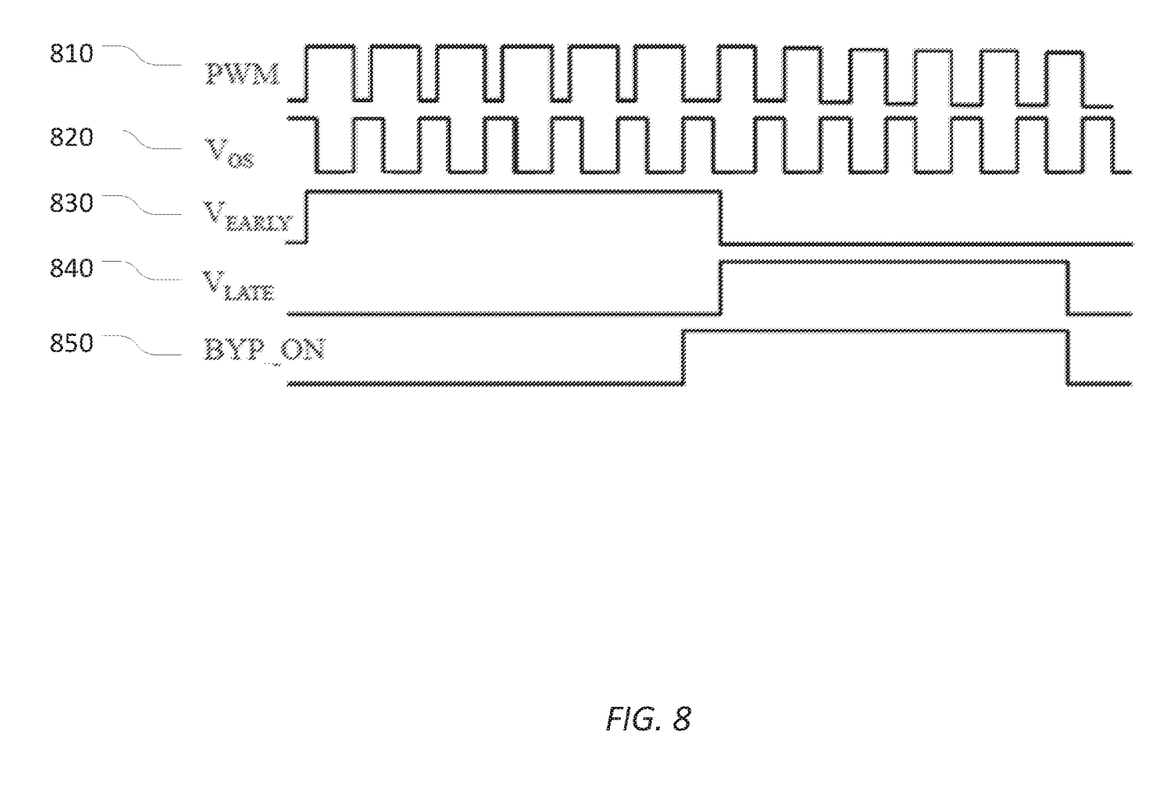
FIG. 8 is a simplified diagram showing timing diagrams corresponding to various nodes of a threshold voltage detection circuit.

FIG. 8 is a simplified diagram showing timing diagrams 810-850 corresponding to various nodes of threshold voltage detection circuit 700. Timing diagram 810 corresponds to the PWM control signal and timing diagram 820 corresponds to one shot signal 720. After six consecutive cycles in which the duration of the off period of the PWM control signal is less than the duration of one shot signal 720, intermediate signal 732 (as depicted in timing diagram 830) transitions from high to low, intermediate signal 734 (as depicted in timing diagram 840) transitions from low to high, and bypass mode signal 245 (as depicted in timing diagram 850) transitions from low to high. Subsequently, after six cycles in which the duration of the off period of the PWM control signal exceeds the duration of one shot signal 720, intermediate signals 732 and 734 and bypass mode signal 245 return to their initial values.

Figure 9:
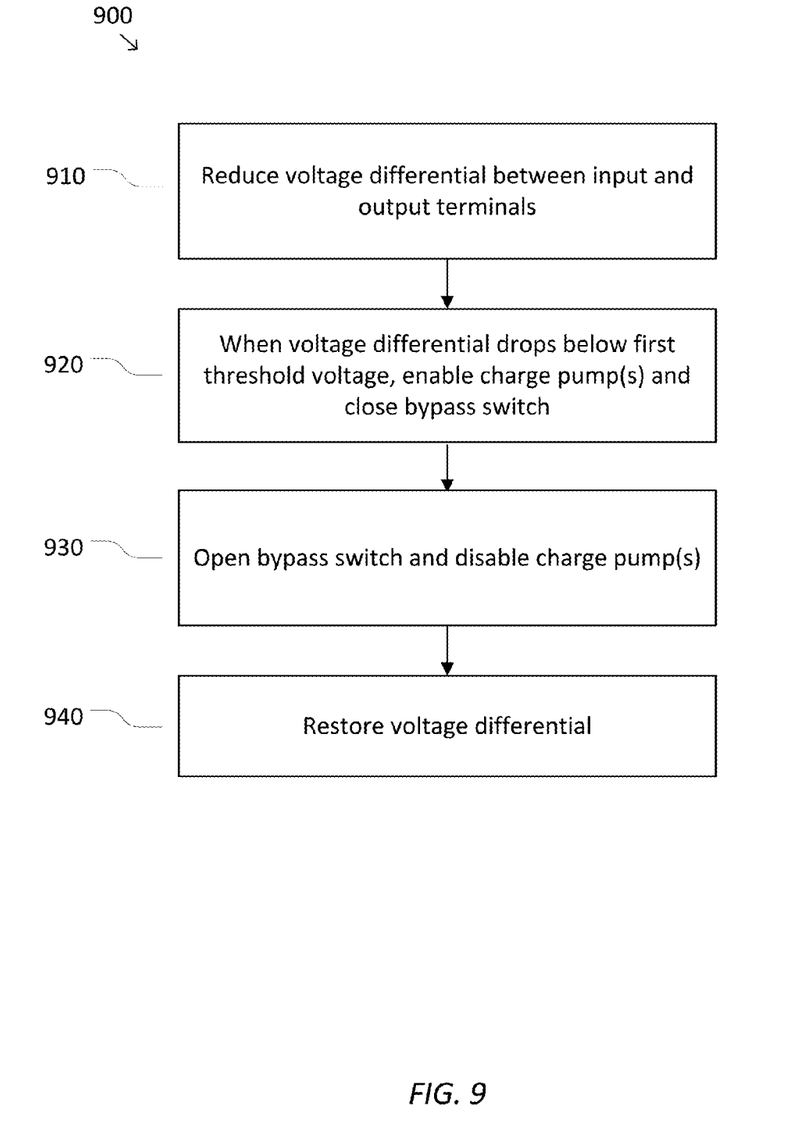
FIG. 9 is a simplified diagram of a method for transitioning between switched mode and bypass mode in a power converter according to some embodiments.

FIG. 9 is a simplified diagram of a method 900 for transitioning between switched mode and bypass mode in a power converter according to some embodiments. According to some embodiments consistent with FIGS. 1-8, method 900 may be used by a controller, such as controller 232, to operate a power converter, such as buck converter 200, when transitioning between a switching mode and a bypass mode. During the switching mode, the power converter operates at a duty cycle of less than 100% to provide an output voltage that is proportional to the input voltage. During bypass mode, a bypass switch coupled between the input and output of the power converter is closed, causing the output voltage to be clamped to the input voltage and the switching circuitry of the power converter to be bypassed. In some examples, the power converter includes an n-type high-side transistor that uses a bootstrap circuit and a high-side supply capacitor to provide a sufficiently high voltage to turn on the high-side n-type transistor during switching mode. The bootstrap circuit may be associated with a maximum duty cycle at which it is effective at charging the high-side supply capacitor.

At a process 910, a differential voltage between the input and output terminals of the power converter is reduced. According to some embodiments, when the output voltage is initially lower than the input voltage, process 910 may include increasing the output voltage by increasing the duty cycle of the power converter. Process 910 may additionally and/or alternately include reducing the input voltage of the power converter. When the power converter is incorporated within a wireless power receiver, reducing the input voltage may include communicating wirelessly and/or over a wire with a wireless power transmitter to adjust the input voltage.

At a process 920, when it is determined that the differential voltage between the input and output terminals has dropped below a threshold voltage, a first charge pump is enabled and the bypass switch is closed. According to some embodiments, the threshold crossing is determined using a threshold voltage detection circuit that monitors the duty cycle of the power converter, such as threshold voltage detection circuit 700. According to some embodiments, the threshold voltage is selected to be sufficiently high so as not to exceed the maximum duty cycle of the bootstrap circuit. Meanwhile, the threshold voltage is desirably as low as possible to avoid damaging the bypass switch by turning it on in the presence of a large voltage differential across its terminals. Accordingly, the threshold voltage is selected to balance these considerations. The first charge pump, once enabled, charges the high-side supply capacitor to allow the high-side transistor to be turned on even when the duty cycle of the power converter exceeds the maximum for the bootstrap circuit. According to some embodiments, process 920 includes enabling a second charge pump for turning on the bypass switch. In some examples, the bypass switch may be turned on by another suitable mechanism. Upon completion of process 920, the power converter is operating in bypass mode.

At a process 930, in order to transition back from bypass mode to switching mode, the bypass switch is opened and the first (and second, when applicable) charge pump is disabled. When the bypass switch is opened, the output voltage ceases to be clamped to the input voltage and the power converter may again be operated at a duty cycle of less that 100%.

At a process 940, the voltage differential between the input and output terminals is restored. According to some embodiments, process 940 may include decreasing the output voltage by decreasing the duty cycle of the power converter. Process 940 may additionally and/or alternately include increasing the input voltage. Like process 910, when the power converter is implemented in a wireless power receiver, increasing the input voltage may include communicating wirelessly and/or over a wire with a wireless power transmitter to adjust the input voltage.

Figure 10:
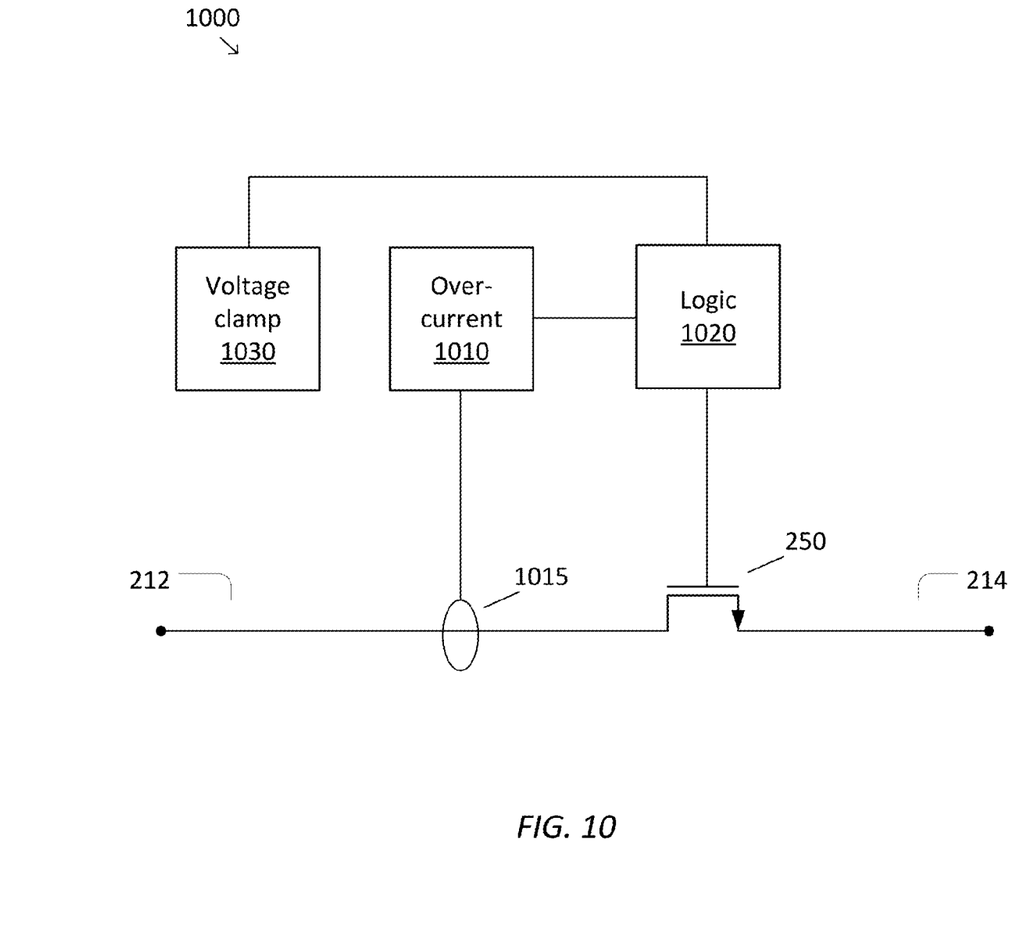
FIG. 10 is a simplified diagram of a bypass switch protection system used to protect a bypass switch of a power converter.

FIG. 10 is a simplified diagram of a bypass switch protection system 1000 used to protect a bypass switch of a power converter. According to some embodiments consistent with FIG. 2, bypass switch protection system 1000 may be used to implement at least a portion of controller 232. Consistent with such embodiments, bypass switch protection system may monitor the current flowing through bypass switch 250 between input node 212 and output node 214 and/or the voltage of input node 212.

Bypass switch protection system 1000 includes an overcurrent protection (OCP) module 1010 coupled to a logic module 1020. OCP module 1010 monitors the current flowing through bypass switch 250 using a current monitor 1015 when the power convert is operating in bypass mode. When OCP module 1010 detects a current that exceeds a current limit, OCP module 1010 transmits a signal to logic module 1020 indicating the occurrence of an over-current event. Logic module 1020 is coupled to bypass switch 250 and opens bypass switch 250 when an over-current event occurs to halt the excessive current flow.

Bypass switch protection system 1000 further includes an input voltage clamp module 1030 coupled to logic module 1020. Input voltage clamp module 1030 monitors the voltage of input node 212 to ensure that the input voltage does not exceed a predetermined clamp voltage. During the transition from switching mode to bypass mode, the input voltage is reduced towards the output voltage. Accordingly, during this transition, input voltage clamp module 1030 receives a signal from logic module 1020 to reduce the clamp voltage to match the adjustment to the input voltage.

Figure 11:
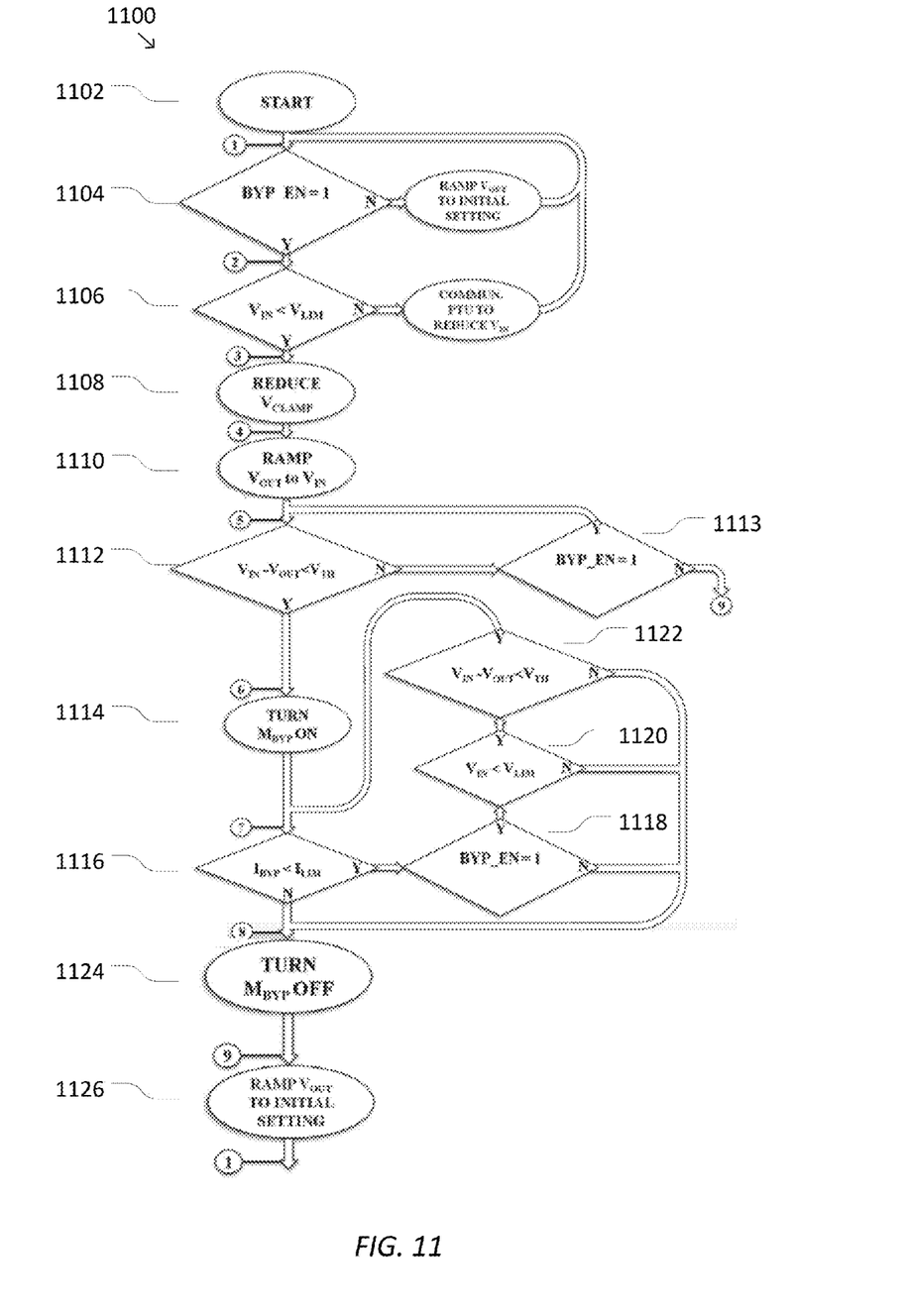
FIG. 11 is a simplified diagram of a state machine for use in a power converter with a bypass switch protection system according to some embodiments.

FIG. 11 is a simplified diagram of a state machine 1100 for use in a power converter with a bypass switch protection system according to some embodiments. In some examples consistent with FIGS. 1-10, state machine 1100 may be implemented using controller, such as controller 232, that includes a bypass switch protection system, such as bypass switch protection system 1000.

State machine 1100 transitions from an initial state 1102 to a bypass enable signal monitoring state 1104. When the bypass enable signal is low, the output voltage of the power converter is maintained and/or adjusted to achieve the target or initial output voltage setting. The state remains state 1104. When the bypass enable signal is high, state machine 1100 transitions to an input voltage monitoring state 1106. When the input voltage is higher than a predetermined upper limit, the controller reduces the input voltage. For example, the controller may communicate with a wireless power transmission unit (PTU) to reduce the input voltage. The state transitions back to 1104. When the input voltage is lower than the predetermined upper limit, state machine 1100 transitions to a clamp voltage reduction state 1108. The clamp voltage is reduced in accordance with the change in input voltage, and state machine 1100 transitions to ramp output voltage state 1110. The output voltage is increased towards the input voltage, and state machine 1100 transitions to a voltage differential monitoring state 1112. When the voltage differential is greater than a threshold voltage, the bypass enable signal is rechecked at state 1113 and, when the bypass enable signal remains high, the state returns to state 1112.

When the voltage differential drops below the threshold voltage, state machine 1100 transitions to a bypass switch turn-on state 1114. The bypass switch is turned on, and state machine 1100 transitions among an over-current monitoring state 1116, a bypass enable signal monitoring state 1118, an input voltage monitoring state 1120, and a voltage differential monitoring state 1122. As long as all of these conditions are satisfied (i.e., no over-current detected, bypass enable signal remains high, input voltage is within predetermined limit, and voltage differential remains below threshold voltage), state machine 1100 continues to transition through states 1112-1118. When one or more of the conditions is breached, state machine 1100 transitions to bypass switch turn-off state 1126. The bypass switch is turned off, and state machine 1100 transitions to an output voltage ramp state. The output voltage is returned to its initial setting, and state machine 1100 returns to bypass enable signal monitoring state 1104.

Some examples of controllers, such as controller 232 may include non-transient, tangible, machine readable media that include executable code that when run by one or more processors may cause the one or more processors to perform the processes of method 900 and/or state machine 1100. Some common forms of machine readable media that may include the processes of method 900 and/or state machine 1100 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A power converter comprising:
   a pulsed switch;
   a capacitor configured to supply a drive voltage to the pulsed switch;
   a bootstrap circuit configured to charge the capacitor when the power converter operates in a switched mode of operation, wherein the pulsed switch is operated at less than 100% duty cycle; and
   a charge pump circuit configured to charge the capacitor when the power converter operates in a bypass mode of operation, wherein the pulsed switch is operated at 100% duty cycle.

2. The power converter of claim 1, wherein the pulsed switch comprises a high-side n-type transistor.

3. The power converter of claim 2, wherein the high-side n-type transistor is an n-type metal-oxide semiconductor (NMOS) transistor.

4. The power converter of claim 1, wherein the power converter is a DC-DC power converter.

5. The power converter of claim 4, wherein the power converter has a synchronous buck topology.

6. The power converter of claim 1, further comprising a bypass switch coupled between an input node and an output node of the power converter.

7. The power converter of claim 6, wherein the bypass switch is an n-type transistor.

8. The power converter of claim 6, further comprising a controller configured to:
   determine when a differential voltage between the output node and the input node falls below a threshold voltage;
   when the differential voltage falls below the threshold voltage:
      close the bypass switch; and
      enable the second circuit.

9. The power converter of claim 8, wherein determining when the differential voltage falls below the threshold voltage comprises monitoring a duty cycle of the power converter.

10. The power converter of claim 8, wherein the controller is communicatively coupled to a wireless power transmitter, the wireless power transmitter supplying an input voltage to the power converter.

11. The power converter of claim 10, wherein the controller communicates with the wireless power transmitter to reduce the input voltage when the power converter transitions from the switching mode to the bypass mode.

12. The power converter of claim 6, further comprising an over-current protection module associated with the bypass switch.

* * * * *